United States Patent
Bhatia et al.

(10) Patent No.: US 11,829,873 B2
(45) Date of Patent: Nov. 28, 2023

(54) PREDICTIVE MODELING OF A MANUFACTURING PROCESS USING A SET OF TRAINED INVERTED MODELS

(71) Applicant: Applied Materials, Inc., Santa Clara, CA (US)

(72) Inventors: Sidharth Bhatia, Santa Cruz, CA (US); Dermot Cantwell, Sunnyvale, CA (US); Serghei Malkov, Hayward, CA (US); Jie Feng, Milpitas, CA (US)

(73) Assignee: Applied Materials, Inc., Santa Clara, CA (US)

( * ) Notice: Subject to any disclaimer, the term of this patent is extended or adjusted under 35 U.S.C. 154(b) by 364 days.

(21) Appl. No.: 16/880,069

(22) Filed: May 21, 2020

(65) Prior Publication Data

US 2021/0365770 A1 Nov. 25, 2021

(51) Int. Cl.
*G05B 13/02* (2006.01)
*G06N 3/08* (2023.01)
(Continued)

(52) U.S. Cl.
CPC ............. *G06N 3/08* (2013.01); *G05B 13/027* (2013.01); *G05B 19/41885* (2013.01); *G06N 3/045* (2023.01); *G05B 2219/32335* (2013.01)

(58) Field of Classification Search
CPC ...... G06N 3/08; G06N 3/0454; G06N 3/0481; G06N 7/005; G06N 20/20; G05B 13/027;
(Continued)

(56) References Cited

U.S. PATENT DOCUMENTS 10,515,306 B1 * 12/2019 David ...................... G06N 3/08
10,839,297 B1 * 11/2020 Ezick .................... G06N 20/20
(Continued)

FOREIGN PATENT DOCUMENTS

WO 2019043425 3/2019
WO WO2020233992 * 5/2019 ............. G06N 3/082

OTHER PUBLICATIONS

Ma, Liying; Constructive feedforward neural networks using hermite polynomial activation functions, 2005, IEEE transactions on neural networks, vol. 16 No. 4; 821-833; URL:<https://ieeexplore.ieee.org/stamp/stamp.jsp?tp=&arnumber=1461425> (Year: 2005).*
(Continued)

*Primary Examiner* — Kenneth M Lo
*Assistant Examiner* — Jonathan Michael Skrzycki
(74) *Attorney, Agent, or Firm* — Lowenstein Sandler LLP (57) ABSTRACT

Disclosed herein is technology for performing predictive modeling to identify inputs for a manufacturing process. An example method may include receiving expected output data for a manufacturing process, wherein the expected output data defines an attribute of an output of the manufacturing process; accessing a plurality of machine learning models that model the manufacturing process; determining, using a first machine learning model, input data for the manufacturing process based on the expected output data for the manufacturing process, wherein the input data comprises a value for a first input and a value for a second input; combining the input data determined using the first machine learning model with input data determined using the second machine learning model to produce a set of inputs for the manufacturing process, wherein the set of inputs comprises candidate values for the first input and candidate values for the second input.

18 Claims, 5 Drawing Sheets

(51) Int. Cl.
*G05B 19/418* (2006.01)
*G06N 3/045* (2023.01)

(58) Field of Classification Search
CPC .... G05B 19/41885; G05B 2219/32335; Y02P 90/02
See application file for complete search history.

(56) References Cited

U.S. PATENT DOCUMENTS

| | | | |
|---|---|---|---|
| 11,055,639 B1* | 7/2021 | Cay | G06Q 10/04 |
| 2010/0082126 A1* | 4/2010 | Matsushita | G06N 3/0454 |
| | | | 706/15 |
| 2011/0320386 A1* | 12/2011 | Liano | G05B 11/32 |
| | | | 706/15 |
| 2019/0095805 A1* | 3/2019 | Tristan | G06N 5/045 |
| 2019/0156244 A1 | 5/2019 | Lee et al. | |
| 2019/0265685 A1 | 8/2019 | Lee et al. | |
| 2019/0271966 A1 | 9/2019 | Coffman et al. | |
| 2019/0337232 A1* | 11/2019 | Prabha Narra | B22F 10/80 |
| 2020/0210847 A1* | 7/2020 | Andoni | G06N 3/0445 |
| 2020/0410413 A1 | 12/2020 | Moki et al. | |

OTHER PUBLICATIONS

International Search Report and Written Opinion for Application No. PCT/US2021/033494 dated Sep. 6, 2021, 10 pages.
PCT Notification Concerning Transmittal of International Preliminary Report on Patentability for PCT Application No. PCT/US2021/033494, dated Dec. 1, 2022, 7 pages.

* cited by examiner

PREDICTIVE MODELING OF A MANUFACTURING PROCESS USING A SET OF TRAINED INVERTED MODELS

TECHNICAL FIELD

The present disclosure relates to predictive modeling, and, more particularly, to using a set of models to predict optimum input parameters for a manufacturing process.

BACKGROUND

Manufacturing involves the production of products using multiple steps that involve human labor, machines, or a combination thereof. The manufacturing steps may be associated with settings that determine when, where, or how the steps are performed and effect the products being manufactured. Process engineers typically select and customize the settings based on their domain expertise. The selection of the settings often involve performing many experiments with different settings to identify one or more optimum settings for the manufacturing process.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In an aspect of the disclosure, a method includes receiving, by a processing device, expected output data for a manufacturing process, wherein the expected output data defines an attribute of an output of the manufacturing process; accessing a plurality of machine learning models that model the manufacturing process, wherein the plurality of machine learning models comprises a first machine learning model and a second machine learning model; determining, using the first machine learning model, input data for the manufacturing process based on the expected output data for the manufacturing process, wherein the input data comprises a value for a first input and a value for a second input; combining the input data determined using the first machine learning model with input data determined using the second machine learning model to produce a set of inputs for the manufacturing process, wherein the set of inputs comprises a plurality of candidate values for the first input and a plurality of candidate values for the second input; and storing, by the processing device, the set of inputs for the manufacturing process in a storage device.

In another aspect of the disclosure, a system includes a memory and a processing device coupled to the memory. The processing device is to receive expected output data for a manufacturing process, wherein the expected output data defines an attribute of an output of the manufacturing process; access a plurality of machine learning models that model the manufacturing process, wherein the plurality of machine learning models comprises a first machine learning model and a second machine learning model; determine, using the first machine learning model, input data for the manufacturing process based on the expected output data for the manufacturing process, wherein the input data comprises a value for a first input and a value for a second input; combine the input data determined using the first machine learning model with input data determined using the second machine learning model to produce a set of inputs for the manufacturing process, wherein the set of inputs comprises a plurality of candidate values for the first input and a plurality of candidate values for the second input; and store the set of inputs for the manufacturing process in a storage device.

In an aspect of the disclosure, a non-transitory machine-readable storage medium storing instructions which, when executed, cause a processing device to perform operations comprising: accessing output data of a manufacturing process, wherein the output data is associated with input data used by the manufacturing process; training a first machine learning model based on the input data and output data; receiving, by a processing device, expected output data for a manufacturing process, wherein the expected output data defines an output attribute of the manufacturing process; accessing a plurality of machine learning models that model the manufacturing process, wherein the plurality of machine learning models comprises the first machine learning model and a second machine learning model; determining, using the first machine learning model, input data for the manufacturing process based on the expected output data for the manufacturing process, wherein the input data comprises a first value for a first input attribute and a first value for a second input attribute; and combining the input data determined using the first machine learning model with input data determined using the second machine learning model to produce a set of inputs for the manufacturing process, wherein the set of inputs comprises a plurality of values for the first input attribute and a plurality of values for the second input attribute.

BRIEF DESCRIPTION OF THE DRAWINGS

The present disclosure is illustrated by way of example, and not by way of limitation in the figures of the accompanying drawings.

DETAILED DESCRIPTION

Manufacturing processes continue to increase in complexity and often include a large amount of steps. Each of the steps may have different configurations and be associated with different process engineers that have different domain expertise. The different steps may be interrelated and may be modeled using computer generated models. The computer generated models are often causal models that represent the causal relationship between manufacturing inputs and the corresponding manufacturing outputs. The models may take as input one or more manufacturing input settings and provide predictions on the effects to the manufacturing outputs. A process engineer may manually select different inputs and use the model to simulate the effects on the manufacturing output. The process engineers often have an intended output they are attempting to create and may hypothesize which inputs to change. The process engineers may then initiate computer simulations or physical experiments to identify inputs need to be modified to produce the intended outputs. When the manufacturing process involves a single process engineer and a low number of inputs this type of input-to-output modeling may be effective. As the number of inputs increase, the variations of inputs rise and make a selection-and-experiment process less efficient.

The technology disclosed herein may address the above and other deficiencies by providing technology that generates a set of models that can be used to predict manufacturing inputs based on an expected manufacturing output (e.g., target attribute, intended result, end goal). The set of models include one or more inverted models that provide output-to-input modeling (as opposed to input-to-output). The set of models use manufacturing output data as model inputs and may provide manufacturing input data as the model output. The models are trained using manufacturing input data (e.g., configuration values) and manufacturing output data (e.g., product attribute values). In one example, the set of models may be a homogenous set that includes machine learning models that are based on a common model architecture but are trained differently to produce different model versions. The training may be based on variations in training data, hyperparameters, initialization values, other differences, or a combination thereof.

The trained machine learning models in the set each receive the same manufacturing output data as model input and each predict a different set of inputs for the manufacturing process. Each set of inputs is selected to result in a product that satisfies the expected output data (e.g., target attributes of manufactured product). The inputs derived using the different models may be combined to identify a range of values for each manufacturing input that is predicted to satisfy or comply with the expected manufacturing output (e.g., attain the target attribute or intended result). In one example, the set of models are Feed Forward Neural Networks (FFNN) and function together in an ensemble learning technique. The output of the set of feed forward neural networks may be clustered into different groups and each group shares similarities in the corresponding set of manufacturing input (e.g., a first group may focus on variations to a first manufacturing input and a second group may focus on variations to a second manufacturing input).

Systems and methods described herein include technology that enhances the identification of manufacturing input data (e.g., configuration parameters) that result in a product with a predefined attribute. In particular, aspects of the present disclosure may reduce the amount of physical experiments or computer simulations performed to identify an optimum set of inputs for the manufacturing process. Traditional process modeling may simulate a manufacturing process by having the model take the manufacturing input data as model input and simulate the output of the manufacturing process. To identify the optimum manufacturing inputs a process engineer may select different combinations of inputs and run them as different simulations. The use of inverted models enables the model to take the end result as input to the model and may output a predicted set of manufacturing inputs that accomplish the end result. This may result in less experiments or better results using the same amount of experiments. The use of multiple models may result in multiple predicted sets of manufacturing input and each may function as candidate solution. The candidate solutions may be combined or clustered and displayed to a user to enable the user to detect patterns amongst the different candidate solutions. This may enable the technology to use machine learning in a manner that provides a level of interpretability and explainability to the predictive modeling. The technology may provide insight into how the manufacturing output is affected by changes to input data and may reduce the number of computer simulations or physical experiments performed to identify a particular solution. Aspects of the present disclosure may also result in significant reduction in process engineering time, resource consumption, processor overhead, and so forth. In one example, the predicted manufacturing input may result in faster process development and optimization (e.g., for semiconductor manufacturing). In another example, the predicted manufacturing input may manufacture the products more quickly and the products may be more optimized (e.g., more likely within specification) than conventional approaches.

Various aspects of the above referenced technology are described in details herein below by way of examples, rather than by way of limitation. The examples provided below discuss a computing device that is integrated with a manufacturing process. In other examples, the computing device may be separate from the manufacturing process and may access data associated with the manufacturing process from a data store and may generate data that can be subsequently used by a computing device or user to configure the manufacturing process.

Figure 1:
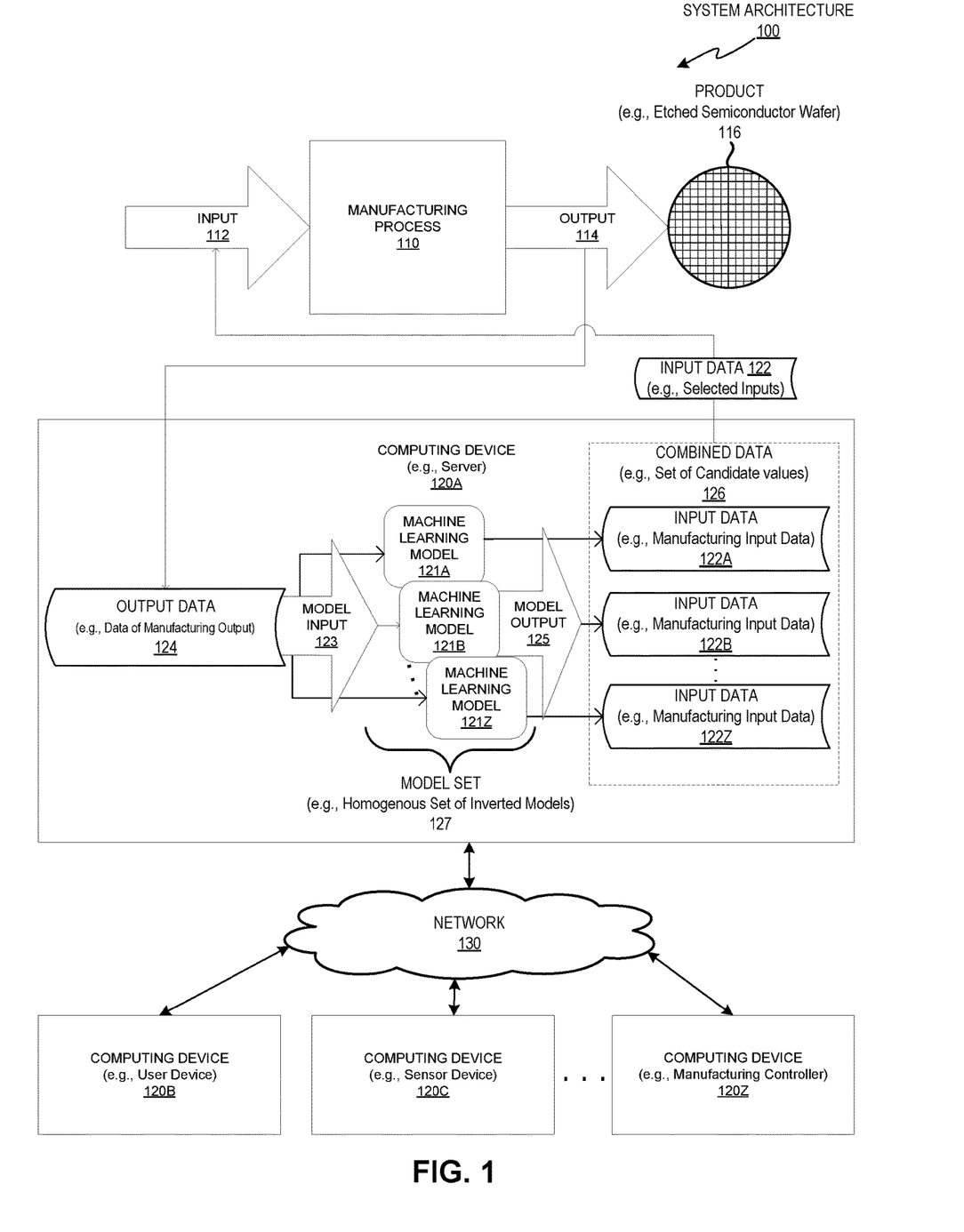
FIG. 1 is a block diagram illustrating an exemplary system architecture, according to certain embodiments.

FIG. 1 is a block diagram illustrating an exemplary system architecture 100, according to certain embodiments. The system architecture 100 includes a manufacturing process 110, input 112, output 114, and one or more computing devices 120A-Z.

Manufacturing process 110 may be any manufacturing process that can provide or produce one or more products 116. Product 116 may be for use or sale and may be a tangible or intangible object, good, service, other product, or a combination thereof. A tangible product may be touched by a human and may include physical products, objects, elements, goods, or other object (e.g., etched wafer, microchip, electronic device). Intangible products may be perceived directly or indirectly by a human without being touched and may include circuit designs, device layouts, manufacturing recipes, tool configuration, computer programs, services, other intangible element, or a combination thereof.

Manufacturing process 110 may involve performing operations based on input 112 to provide output 114. Input 112 may include any inputs used by manufacturing process 110 to provide product 116. Input 112 may include one or more input products that are modified, assembled, or combined during manufacturing process 110. Output 114 may be anything output by manufacturing process 110 and may include product 116 as well as any byproducts of manufacturing process 110. Both input 112 and output 114 may be associated with data, for example, input 112 may be associated with input data 122 (e.g., configuration data) and output 114 may be associated with output data 124 (e.g., product attribute data).

Input data 122 may be any data that defines one or more inputs for manufacturing process 110. Input data 122 may indicate one or more attributes of input products, configurations, settings, or other data. Input data 122 may be the same or similar to parameter data, settings data, configuration data, other data, or a combination thereof. Input data 122 may include one or more values that indicate how the manufacturing process will be performed (e.g., parameter values, setting values, configuration values). In one example, the input data 122 may include one or more values corresponding to time (e.g., deposition time, etch time, oxidation time, implantation time, cleaning time), energy (e.g., temperature, current, voltage, electromagnetic frequency), input rate (e.g., gas flow rate, wafer spin speed), distance (e.g. space between substrate and tool, feature width, height, depth), pressure (e.g., Pascal, bar), input substance (e.g., precursor, reactant, dilutant), other attribute or property, or a combination thereof.

Output data 124 may be any data that describes one or more outputs of manufacturing process 110. Output data 124 may describe one or more attributes of product 116, by-products, other output, or a combination thereof. Output data 124 may include values that indicate an actual attribute of product 116 after it is created or an intended attribute of product 116 before product 116 is created. The attributes may correspond to one or more measurements of product 116. The measurements may be related to dimensions (e.g., length, width, height, depth, thickness, radius, diameter, area, volume, size), material property (e.g., reflectivity, emissivity, absorptivity, conductivity, density, texture), uniformity (e.g., film thickness uniformity), location (e.g., relative or absolute position), other attribute, or a combination thereof. In one example, output data 124 may indicate the attributes of product 116 in the form of an N-point metrology, wherein N indicates the number of reference measurements for the product (e.g., 49 point metrology). The N-point metrology may provide critical dimensions for one or more electronic components of a semiconductor product (e.g., dimensions of transistor or via).

Computing devices 120A-Z may include one or more computing devices that are associated with manufacturing process 110. Computing devices 120A-Z may include an embedded system, a server, a workstation, a personal computer, a laptop computer, a tablet computer, a mobile phone, a palm-sized computing device, a personal digital assistant (PDA), etc. In one example, computing devices 120A-Z may include computing devices implemented with x86 hardware (e.g., Intel® or AMD®). In another example, computing devices 120A-Z may include computing devices implemented with PowerPC®, SPARC®, or other hardware.

One or more of the computing devices 120A-Z may function as manufacturing control devices, sensor devices, user devices, other devices, or a combination thereof. A manufacturing control device (e.g., controller) may control a portion of the manufacturing process and may access, generate, or transmit input data 122, output data 124, or a combination thereof. A sensor device (e.g., sensor) may be capable of perceiving an aspect of manufacturing process 110 or an aspect of product 116 and may involve a measurement component that is capable of measuring an attribute of the manufacturing process 110 or product 116. In one example, the sensor device may include an image capturing module or an acoustic capturing module. User devices may be the same or similar to a client device and may provide a user interface for a user (e.g., process engineer). The user interface may present (e.g., display and/or announce) information to a user and may include one or more control elements for gathering user input. One or more of computing devices 120A-Z may use a set of machine learning models 121A-Z to determine input data 122A-Z for manufacturing process 110.

Machine learning models 121A-Z may mathematically model manufacturing process 110 and the relationships between input 112 and output 114. Each of the machine learning models 121A-Z may be a regression model that can be used to identify one or more points within a process space of the manufacturing process. The process space may represent the manufacturing input and output relationships in a finite space. The process space may include an explored portion of the process space and an unexplored portion of the process space. The explored portion may correspond to points or regions within the process space that correspond to prior physical experiments, computer simulated experiments, or a combination thereof. The unexplored portion of the process space may corresponds to potential or theoretical experiments. The process space may include any number of dimensions and the number of dimensions may relate to the number of attributes of the manufacturing inputs, manufacturing outputs, or a combination thereof. Each of the machine learning models 121A-Z may be used to approximate the process space and identify potential solutions within the process space. A potential solution may be a set of one or more manufacturing inputs and may correspond to a point, line, plane, area, volume, or other region within the process space.

Each of the machine learning models 121A-Z may be an artifact of a machine learning process that analyzes training data and creates a model that represents patterns and inferences derived from the training data. A machine learning model may be the same or similar to a mathematical model, statistical model, neural network, other mathematical representation, or a combination thereof. Each of the machine learning models 121A-Z may include mathematical data for one or more mathematical functions, equations, expressions, operators, operands, coefficients, variables, weights, biases, links, other data, or a combination thereof.

The mathematical data may represent relationships between model input 123 and model output 125. The relationships may be modeled using linear functions, non-linear functions, other mathematical functions, or a combination thereof. A linear function may indicate a linear relationship between model input and model outputs and may be represented as a mathematical function whose graph is a straight line. A non-linear function may indicate a non-linear relationship between model input and model output and may be represented as a polynomial function (e.g., quadratic equation) that when graphed is not a straight line and instead includes one or more curves. Using a linear function to map relationships between inputs and outputs may be advantageous because it enables extrapolation to be performed easier than a non-linear function and is discussed in more detail in regards to FIG. 2.

Machine learning models 121A-Z may be neural networks that are trained and used as part of a deep learning process. A neural network may be referred to as a network, an artificial neural network (ANN), or other term. In one example, machine learning models 121A-Z may include one or more Feed Forward Neural Networks (FFNN). Each FFNN may include multiple layers and data provided as model input may travel "forward" in one direction between the multiple layers without any feedback loops (e.g., data goes from input layer to output layer during an inference). In other examples, machine learning models 121A-Z may include one or more layers or features of a Convolutional Neural Network (CNN), a Multi-Layer Perceptron Neural Network (MLP), a Fully Connected Neural Network, a Radial Basis Function Neural Network (RBF), a Recurrent Neural Network (RNN), a Modular Neural Network, a Kohonen Self Organizing Neural Network, other network, or a combination thereof. In either example, the neural network may organize the mathematical data into one or more layers.

Each of the layers of a neural network may perform different transformations on input to the layer. Data may be transmitted from a first layer to the last layer and may or may not traverse a layer more than once (e.g., typically once for a FFNN). The multiple layers may include an input layer (e.g., first layer), an output layers (e.g., last layer), and one or more intermediate layers (e.g., hidden layers). In one example, the neural network may include intermediate layers that include non-linear functions and the output layer may include one or more linear functions. For example, the output layer may include a linear activation function and may be absent a non-linear activation function (e.g., missing, free, or without any mathematical non-linearity).

The linear activation function may be the same or similar to a transfer function and may define the output of an element given an input or set of inputs. In one example, the activation function may be a rectifier function that is defined as $f(x)=x+=\max(0,x)$ and may receive negative and positive inputs and may output values that are greater than or equal to zero and are absent negative values. The rectifier function may be implemented by a Rectifier Linear Unit (ReLU) and may be the same or similar to a ramp function and may be analogous to half-wave rectification in electrical engineering. In other examples, the activation function may be a logistic sigmoid function, a hyperbolic tangent function, a threshold function, other function, or a combination thereof.

Each of the machine learning models 121A-Z may function as a non-inverted model, an inverted model, or a combination thereof. A non-inverted model may model a manufacturing process and take input data of the manufacturing process as model input and provide output data of the manufacturing process as model output (e.g., map manufacturing inputs to outputs). This may enable the model to simulate the execution of the manufacturing processing. In contrast, an inverted model may model the manufacturing process in reverse and may use manufacturing output data 124 as model input 112 and provide manufacturing input data 122 as model output 114 (e.g., map manufacturing output to input). The use of an inverted model may be advantageous because it may enable the model to take the end result as input to the model and may provide a predicted set of inputs for accomplishing the end result. A set of one or more inverted models may be used to identify input data for manufacturing process 110, as shown by model set 127.

Model set 127 may be a homogenous set of machine learning models, a heterogeneous set of machine learning models, or a combination thereof. A homogenous set of machine learning models may be a set in which all of the machine learning models share a model architecture. In contrast, a heterogeneous set of machine learning models may be a set in which there is at least one model in the set that is based on a different model architecture. A model architecture may correspond to the type of neural network and each of the example neural networks discussed above may have a different model architecture (e.g., FFNN, CNN, RNN). As shown in FIG. 1, model set 127 may be a homogenous set of machine learning models that may be referred to as a model cluster and each of the machine learning models 121A-Z may be a different version of the same machine learning model.

Different versions of a machine learning model may be created by using a common model architecture and training the models differently. Training models differently may involve using different training techniques, different training data, other training variations, or a combination thereof. The different training techniques may involve using different training parameters, different model initialization values, other variations, or a combination thereof. The training parameters may be referred to as hyperparameters and may be set before the training process begins to update or create the machine learning model. The training process is discussed in more detail in regards to FIGS. 2 and 3.

Machine learning models 121A-Z may each generate its own model output and the collective output of model set 127 may be combined. Each of machine learning models 121A-Z may have access to the same model input 123 but may generate different model output 125. This is illustrated in FIG. 1, in which the same output data 124 is provided to each of machine learning models 121A-Z and the machine learning models 121A-Z each output respective data for the manufacturing process (e.g., input data 122A-Z). The combination of model output 125 may result in combined data 126. Combined data 126 may correspond to one or more candidate solutions and may indicate a region within the process space of manufacturing process 110, as discussed in more detail below in regards to FIG. 2.

Figure 2:
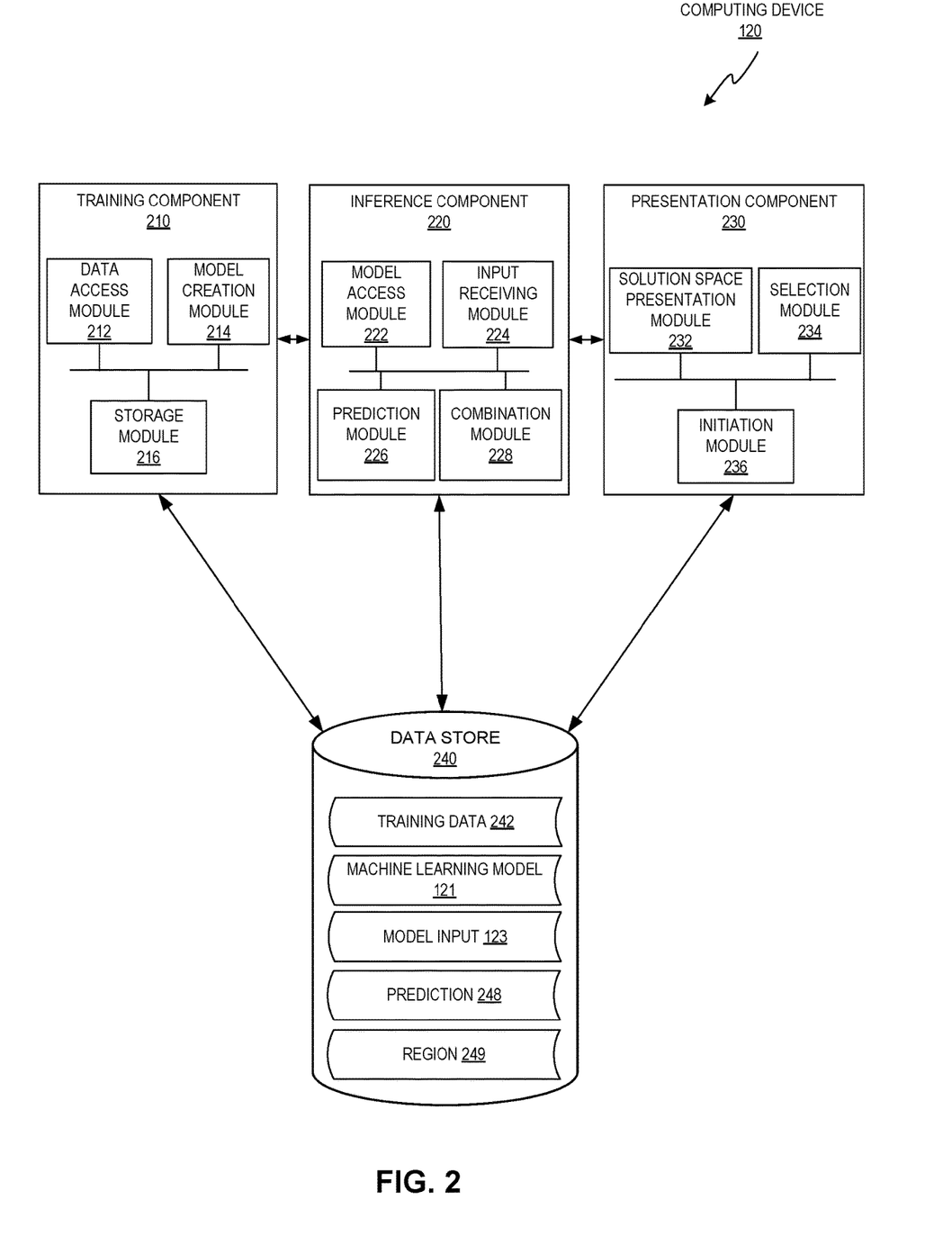
FIG. 2 is an example computing device, according to certain embodiments.

FIG. 2 depicts a block diagram illustrating an exemplary computing device 120 that includes technology to perform predictive modeling for a manufacturing process using a set of inverted models, in accordance with one or more aspects of the present disclosure. Computing device 120 may be the same or similar to one or more of computing devices 120A-Z of FIG. 1. The components and modules discussed herein may be performed on the same computing device or on different computing device. In one implementation, one or more of the components may reside on different computing devices (e.g., training on a first computing device and inference on a different computing device). More or less components or modules may be included without loss of generality. For example, two or more of the components may be combined into a single component, or features of a component may be divided into two or more components. In the example shown in FIG. 2, computing device 120 may include a training component 210, an inference component 220, and a presentation component 230.

Training component 210 may enable computing device 120 to analyze data of a manufacturing process and create one or more machine learning models. In one example, training component 210 may include a data access module 212, a model creation module 214, and a storage module 216.

Data access module 212 may access data associated with the manufacturing process and store the data as training data 242. Training data 242 may be any data related to the manufacturing process and can be used to train one or more machine learning models. Training data 242 may include or be derived from input data for the manufacturing process (e.g., input data 122), output data for the manufacturing process (e.g., output data 124), other data, or a combination thereof. The input data for the manufacturing process may be the same as discussed above in regards to input data 122 and may include a set of values with one or more values for time, temperature, pressure, voltage, gas flow, or other values. The output data for the manufacturing process may be the same as discussed above in regards to output data 124 and may include one or more values that indicate a value of a layer thickness, a layer uniformity, or a structural width, other critical dimension, or a combination thereof. Data access module 212 may perform one or more processing operations on data before, during, or after storing the data in data store 240 as training data 242. The processing may be referred to as pre-processing or post-processing and may involve one or more operations to aggregate, correlate, normalize, add, remove, filter, sterilize, anonymize, or other operation.

Training data 242 may include or be based on historical data, simulated data, augmented data, other data, or a combination thereof. The historical data may be derived from one or more physical executions of the manufacturing process and the physical executions may be for commercial use, test use, experimental use, research and development use, other use, or a combination thereof. The simulated data may be derived from one or more computer simulations of the manufacturing process and may be the output of one or more machine learning models (e.g., input-to-output models). Augmented data may be based on historical or simulated data that is manipulated to include a variation that may or may not be present in the data being manipulated. The variation may alter the data using one or more mathematical transformations (e.g., rigid transformation, add noise, remove noise). The augmented data may be the same or similar to synthetic data and may be a modified form of input data, output data, or combination thereof.

Training data 242 may include labeled data, unlabeled data, or a combination thereof. Labeled data may include primary data (e.g., a sample) that is supplemented with auxiliary data (e.g., label). The auxiliary data be a tag, annotation, link, label, or other data. Unlabeled data may be data that is absent labels (e.g., missing labels, free of labels, without labels). The unlabeled data may be stored without labels and may or may not remain unlabeled prior to being used to train a machine learning model. In one example, training data 242 may be labeled data that includes manufacturing output data that is annotated to link it with the corresponding manufacturing input data. In another example, the manufacturing input data may be annotated with the corresponding manufacturing output data. In yet another example, there may be a combination thereof.

Model creation module 214 may enable computing device 120 to analyze training data 242 and create machine learning model 121. Model creation module 214 may use a standardized, proprietary, open source, or other training framework to train a machine learning model. Model creation module 214 may configure the training framework to access training data 242 derived from prior runs of the manufacturing process (e.g., physical or simulated runs). In one example, the training framework may be the same or similar to Tensorflow™, Keras™, PyTorch™, Open Neural network Exchange (Onnx™), Cognitive Toolkit (CNTK), Azure Machine Learning Service, Create ML, other machine learning framework, or a combination thereof.

Model creation module 214 may use the training framework to create a set of one or more models. The set of machine learning models may be a homogenous set of machine learning models that share a model architecture and comprise different versions of the model architecture. The different versions of machine learning models may each be trained using different training data, different hyperparameters, different initialization values, other variations, or a combination thereof. In one example, each of the machine learning models may be a Feed Forward Neural Network that models the manufacturing process (e.g., output-to-input). Each Feed Forward Neural Network may include a plurality of hidden layers and an output layer. The number of layers may vary between the different versions of the machine learning model and the hidden layers may include polynomial functions that represent the manufacturing process and the output layer may include a linear activation function. In one example, model creation module 214 may train the machine learning model using one or more monte-carlo simulations. The monte-carlo simulation may estimate a portion of the n-dimensional process space that is explored using physical or computer generated experiments. To better extrapolate outside the explored space, the machine learning model may be created to model the output to input relationship (e.g., an inverse model).

Storage module 216 may enable computing device 120 to store the results of the training in data store 240 as machine learning model 121. The machine learning model 121 may be stored as one or more file objects (e.g., files, directories, links), database objects (e.g., records, tuples), other storage objects, or a combination thereof. Data store 240 may be a memory (e.g., random access memory), a drive (e.g., a hard drive, a flash drive), a database system, or another type of component or device capable of storing data. Data store 240 may include multiple storage components (e.g., multiple drives or multiple databases) that may span multiple computing devices (e.g., multiple server computers). Machine learning model 121 may be transmitted to one or more other data stores or computing devices and made accessible to inference component 220

Inference component 220 may enable computing device 120 to use machine learning model 121 to generate a prediction 248. Inference component 220 may be the same or similar to an inference engine and may receive as input a machine learning model 121 and data of an instance and may make an inference. The inference may be the same or similar to prediction 248 and may correspond to one or more values. As discussed herein, inference component 220 may receive expected manufacturing output data (e.g., target attribute values) and may output predicted manufacturing input data (e.g., process configuration values) in view of machine learning model 121. In one example, inference component 220 may include a model access module 222, an input receiving module 224, a prediction module 226, and a combination module 228.

Model access module 222 may enable computing device 120 to access a set of one or more machine learning models. The set may include a single machine learning model or multiple machine learning models that may or may not share a common model architecture. In one example, model access module 222 may receive the set of one or more machine learning models from a local location (e.g., data store 240). This may occur when computing device 120 created the machine learning model or when the machine learning model is created by another computing device and is installed, packaged, downloaded, uploaded, or transmitted to computing device 120. In another example, model access module 222 may access the set of one or more machine learning models over a computer network 130 from a server on the same network or on a different network (e.g., internet). This may enable a customer to receive a model or an update to the model from a third party (e.g., manufacturing tool creator or distributor). In either example, the machine learning model may include mathematical data for analyzing model input from input receiving module 224.

Input receiving module 224 may enable computing device 120 to receive input data that can be used as model input 123 for machine learning model 121. In one example, the input data may be based on user input that a user provides to a computing device (e.g., process engineer enters into a user device). In another example, the input data may be based on device input that a management device provides to computing device 120. The management device may identify the model input 123 and may initiate one or more physical experiments or computer simulated experiments. In either example, the input data may be used as model input 123 or may be used to transform, identify, select, or derive model input 123. Model input 123 may then be used by prediction module 226.

Prediction module 226 may analyze model input 123 in view of machine learning model 121 to determine the model output. The model output may include one or more predictions 248 that each include a set of one or more values. As discussed above, the set of values may be manufacturing input values (e.g., parameter values) that are used to configure the manufacturing process. Prediction module 226 may function as an inference engine or may be integrated with a standardized, proprietary, or open source inference engine. In one example, prediction module 226 may determine, using a machine learning model, input data for the manufacturing process based on the expected output data for the manufacturing process. The model output may include a value for a first input (e.g., time) and a value for a second input (e.g., energy). Determining the values for the first and second inputs may involve using the machine learning model that is able to predict the model output values in an unexplored area of the process space.

Predicting the model output values may involve using the machine learning model to interpolate, extrapolate, or a combination thereof. Interpolating may involve determining a point in the process space that is between points that have been explored using experiments. Extrapolation may involve determining a point in the process space that exceeds points that have been explored using experiments. The interpolation or extrapolation may be performed using one or more tangents. A tangent may contact a curve at one or more points of tangency and may include one or more tangent points, tangent lines, tangent planes, tangent spaces, other n-dimensional tangent, or a combination thereof. In one example, a straight line may be tangent of a curve $y=f(x)$ at a point $x=c$ on the curve if the line passes through the point $(c,f(c))$ on the curve and has slope $f'(c)$, where $f'$ is the derivative off. A similar definition may apply to space curves and curves in n-dimensional Euclidean space. The tangent may include one or more points of tangency in which the tangent passes through or meets a curve (e.g., just touches the curve).

The extrapolation may be a linear extrapolation that is based on a mathematical function of the machine learning model. Extrapolation of a regression model outside the training set limits may be problematic, especially if there are non-linearities in the model functions, or if the selected regression algorithm imposes restrictions on extrapolation (e.g., Gaussian process regression). However, using an inverted model, the prediction module 226 may project linearly at tangents to the model input space boundary, while retaining the potential non-linear relationships derived from the explored portion of the process space. In one example, the machine learning model may be a neural network that includes non-linear activations in the hidden layers and a linear activation function in the output layer. The linear activation function may enable more efficient and accurate linear extrapolation. This is advantageous because it may enable an implementer of the manufacturing process to leverage existing experiments to more efficiently identify a portion of an unexplored portion of the process space that includes the solution (e.g., the set of configurations that results in a product that satisfies the target attributes).

Combination module 228 may combine the output of multiple different machine learning models to identify a region of the process space in which one or more solutions may reside. The output of each machine learning model may represent a particular point in an n-dimensional process space. One or more of the n-dimensions may correspond to an input parameter and the particular point may correspond to a value in each of the dimensions and therefor correspond to a set of input values (e.g., n values for then input dimensions). For example, a point in a three dimensional process space may include a value for each of the x, y, and z axis, where each axis corresponds to a different manufacturing input. Combination module 228 may combine the output of multiple machine learning models to identify a region within the process space and that region may be referred to as the solution space. The region of the process space may include multiple predicted points (e.g., a distribution of points) rather than a point estimate and may correspond to a region of unexplored space where a solution may reside. In summary, a point in the process space may be a particular predicted solution and the region within the process space may include multiple predicted solutions. The combination module 228 may combine the multiple predicted solutions into a combined set (e.g., combined data 126). The combined set may include a combined value for each of the inputs. The combined value may be a range of values (e.g., value 1.04x-2.03x), a set of values (e.g., 22 nm, 14 nm, 10 nm, 7 nm, 5 nm), a base value with a variance value (e.g., a beginning, middle or end value with a size value), other value, or a combination thereof.

Combination module 228 may identify the region in the process space by analyzing the model output of a set of machine learning models to identify the region. The dimensionality of region may depend on the dimensionality of the process space and may correspond to a line, area, volume, or other multidimensional region. In a simplified example, the model output of the set of machine learning models may be represented as a point cloud within an unexplored region of an n-dimensional process space (e.g., 3D space). Combination module 228 may analyze the point cloud and identify a region which may have any shape (e.g., sphere, cube, pyramid, torus). The identified region may represent the solution space and may include some of the model output points or all of the model output point. The region (e.g., solution space) may correspond to a finite or infinite number of points and each point may be a candidate solution. An advantage of combination module 228 is that the identified region may be considerably smaller than the process space and may be within an unexplored space, an explored space, or a combination thereof. In one example, combination module 228 may identify the region in the process space by using an ensemble technique.

An ensemble technique may be the same or similar to ensemble learning or ensemble methods and may use a set of machine learning models to obtain predictive performance that is better than any individual machine learning model of the set. Ensemble techniques may combine the output of the plurality of machine learning models. The machine learning models may be referred to as weak learners when they are based on less features, trained on less data, have lower accuracy, larger variations, other aspect, or a combination thereof. The weak learners may each approximate an output without overfitting the training data.

The technology disclosed herein may use one or more different types of ensemble techniques, such as bagging, boosting, stacking, other technique, or a combination thereof. Bagging may involve treating each model output of the set with equal weight. In order to promote model variance, bagging may involve training each model of the set using a randomly drawn subset of a training data set. In one example, the set of models may be a homogeneous set of models that are trained differently from one another in parallel and the model output may be combined using an averaging process (e.g., a deterministic averaging). Boosting may involve incrementally building a combined input (e.g., identified region) by training each new model instance to emphasize the training instances that previous models misclassified. Boosting may yield better accuracy than bagging, but may be more likely to over fit the training data. In one example, boosting may involve a homogeneous set of models that are trained sequentially and one or more models may depend one or more previous models (e.g., a base model and intermediate model). Stacking may involve training a learning technique to combine the predictions of several other learning techniques. All of the other algorithms are trained using the available data, then a combiner algorithm is trained to make a final prediction using all the predictions of the other algorithms as additional inputs. In one example, stacking may involve a heterogeneous set of models and they may be trained in parallel and the model output may be combined using another model (e.g., a meta-model, aggregation model, combining model) that outputs a prediction based on the different constituent predictions. In other examples, the ensemble technique may involve Bayesian Model Combination (BMC), Bayesian Model Averaging (BMA), other technique, or a combination thereof.

Combination module 228 may also or alternatively perform an unsupervised machine learning task to group the model outputs into multiple regions (e.g., multiple solutions spaces). The unsupervised machine learning task may be the same or similar to clustering that may group the points based on their features (e.g., corresponding input values) and may select both the number of groups and the group boundaries based on feature patterns. Each of the groups may correspond to an identified region (e.g., solution space) and may be referred to as a cluster, collection, classification, set, subset, other term, or a combination thereof. Each group may have a centroid and a centroid variance that defines the group and indicates the region in the process space. The clustering may be performed based on a clustering technique that is the same or similar to K-Means, K-Medoids, Fuzzy C-Means, Hierarchical, Gaussian Mixture, Hidden Markov Model, other technique, or a combination thereof. The combination module 228 may then store the one or more points, regions, or other data in data store 240 as region 249.

Presentation component 230 may access data of inference component 220 and may present the data to a user. In one example, presentation component 230 may include a solution space presentation module 232, a selection module 234, and an initiation module 236.

Solution space presentation module 232 may enable computing device 120 to provide a user interface that displays the one or more solutions spaces. The user interface may be a graphical user interface that includes one or more graphs and each graph may include one or more dimensions (e.g., x, y, and z dimension). Each of the dimensions may correspond to a manufacturing input and the location of a point or region in relation to the dimension may indicate the value for the manufacturing input. A graph may display experimental points, predicted points, or a combination thereof. For example, a graph may represent the process space (e.g., available manufacturing input values) and may display points corresponding to each of the physical experiments (e.g., experimental points) and points based on the model output (e.g., predicted points). The predicted points may be between the experimental points when based on interpolation or may be beyond the experimental points when based on extrapolation. A graph may emphasize a point or region using one or more of a line (e.g., separation line, boundary line, outline), color (e.g., red points, red region), formatting (e.g., bold, underline, italicized), other emphasis, or a combination thereof.

When a point within the solution space corresponds to more than three dimensions (e.g., a vector with more than three values) it may be challenging to visualize the corresponding set of input values using a single graph. The user interface may then provide multiple graphs that each represent the same point or region and display it along different dimensions. For example, a single point may correspond to values along an x dimension (e.g, temperature value), y dimension (e.g., pressure value), z dimension (e.g., distance value), and t dimension (e.g., time value). The first graph may visually represent the point along an x and y dimensions (e.g., graph with an x and y axis) and the second graph may visually represent the point along the z and t dimensions (e.g., graph with an z and t axis).

Selection module 234 may enable computing device 120 to select one or more points or regions within a solution space. The selection may be based on user input, device input, other input, or a combination thereof. In one example, selection module 234 may receive user input of a user (e.g., process engineer) that identifies the one or more points or regions within the solution space. In another example, selection module 234 may receive device input of a management device (e.g., manufacturing controller) that identifies one or more points or regions within the solution space. Selection module 234 may then present one or more details about the selection (e.g., predicted input values) and store the selection or otherwise make the selection available to initiation module 236.

Initiation module 236 may enable computing device 120 to initiate an experiment in view of a solution (e.g., point in the solution space). The experiment may be a physical experiment that causes one or more manufacturing devices to modify a physical product or may be computer simulated experiment that models the effects of the manufacturing process on one or more products. Initiation module 236 may analyze the selection and determine input data for the manufacturing process and provide the data to one or more computing device that perform the experiments.

Figure 3:
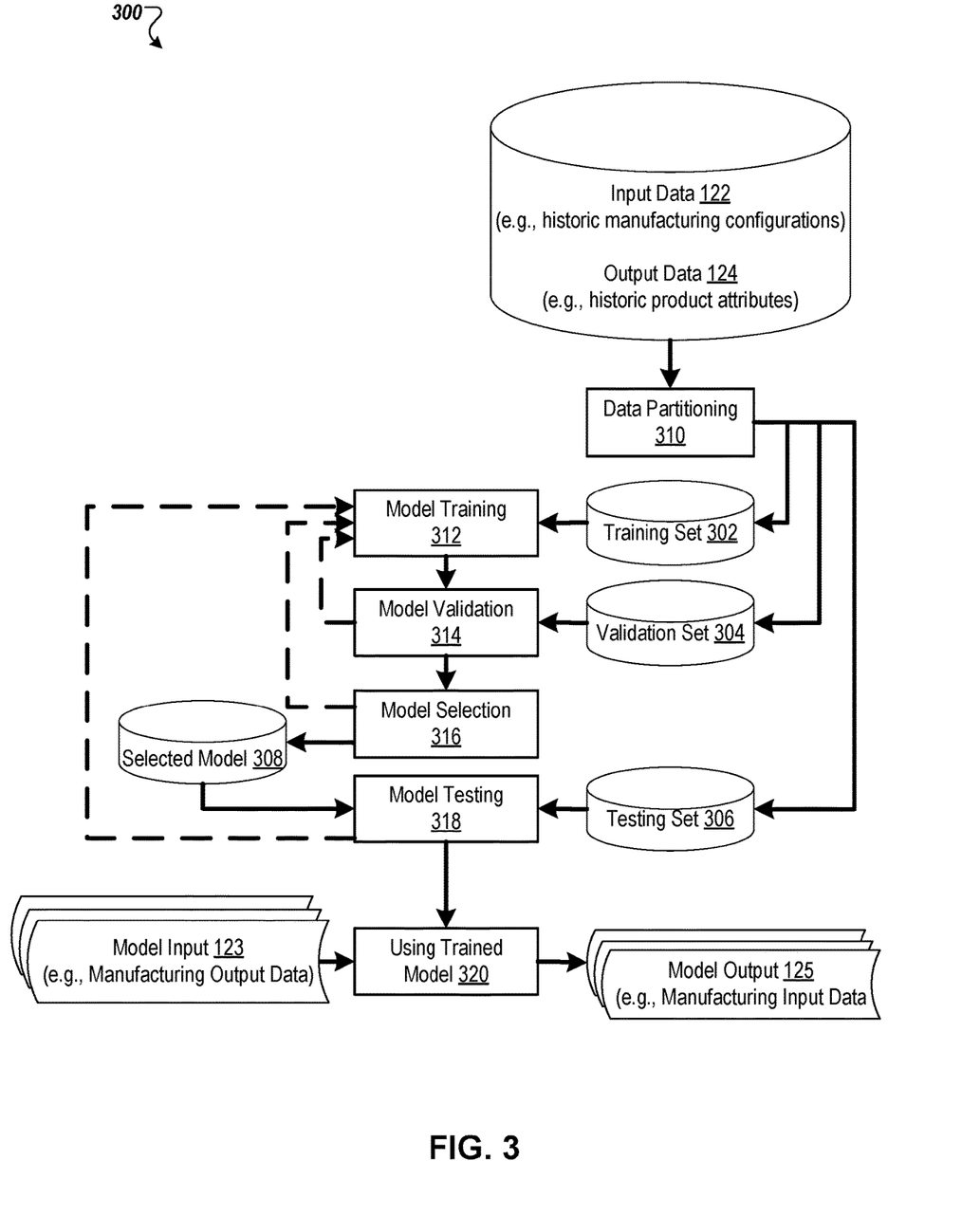
FIG. 3 is a block diagram illustrating an example system to train machine learning models, according to certain embodiments.

FIG. 3 is a block diagram illustrating a system 300 for training and selecting a machine learning model. System 300 may perform data partitioning 310 of the input data 122 and output data 124 of manufacturing process 110 to generate the training set 302, validation set 304, and testing set 306. For example, training set 302 may be 60% of the superset of available data from the manufacturing process, validation set 304 may be 20% of the superset, and testing set may be 20% of the superset. System 300 may generate a plurality of sets of features for each of the training, validation, and testing sets. For example, input data 122 and output data 124 of the manufacturing process may represent data of a 100 runs with 20 manufacturing inputs (e.g., process parameters, hardware parameters, etc.). A first data set and the second data set may both include all 20 manufacturing inputs but the first data set may include the data of runs 1-50 and the second data set may include the data of runs 51-100.

At block 312, system 300 may perform model training using the training set 302 in view of training component 210 of FIG. 2. The system 300 may train multiple models using multiple sets of features of the training set 302 (e.g., a first set of features of the training set 302, a second set of features of the training set 302, etc.). For example, system 300 may train a machine learning model using the first set of features in the training set (e.g., annotated manufacturing output data) and to generate a second trained machine learning model using the second set of features in the training set. In some embodiments, the first trained machine learning model and the second trained machine learning model may be used to generate a third trained machine learning model (e.g., which may be a better predictor than the first or the second trained machine learning model on its own). In some embodiments, sets of features used in comparing models may overlap. In some embodiments, hundreds of models may be generated including models based on the same training set or on different training sets.

At block 314, the system 300 performs model validation using the validation set 304. The system 300 may validate each of the trained models using a corresponding set of features of the validation set 304. For example, system 300 may validate the first trained machine learning model using the first set of features in the validation set and the second trained machine learning model using the second set of features in the validation set. In some embodiments, the system 300 may validate hundreds of models (e.g., models with various permutations of features, combinations of models, etc.) generated at block 312.

At block 314, the system 300 may also or alternatively determine an accuracy of each of the one or more trained models and may determine whether one or more of the trained models has an accuracy that meets a threshold accuracy. Responsive to determining that none of the trained models has an accuracy that meets a threshold accuracy, flow returns to block 312 where the system 300 performs model training using different sets of features of the training set. Responsive to determining that one or more of the trained models has an accuracy that meets a threshold accuracy, flow continues to block 316. The system 300 may discard the trained machine learning models that have an accuracy that is below the threshold accuracy (e.g., based on the validation set).

At block 316, the system 300 may perform model selection to determine which of the one or more trained models that meet the threshold accuracy has the highest accuracy (e.g., the selected model 308, based on the validating of block 314). Responsive to determining that two or more of the trained models that meet the threshold accuracy have the same accuracy, flow may return to block 312 where the system 300 performs model training using further refined training sets corresponding to further refined sets of features for determining a trained model that has the highest accuracy.

At block 318, the system 300 performs model testing using the testing set 306 to test the selected model 308. The system 300 may test, using the first set of features in the testing set, the first trained machine learning model to determine the first trained machine learning model meets a threshold accuracy (e.g., based on the first set of features of the testing set 306). Responsive to accuracy of the selected model 308 not meeting the threshold accuracy (e.g., the selected model 308 is overly fit to the training set 302 and/or validation set 304 and not applicable to other data sets such as the testing set 306), flow continues to block 312 where the system 300 performs model training (e.g., retraining) using different training sets corresponding to different sets of features. Responsive to determining that the selected model 308 has an accuracy that meets a threshold accuracy based on the testing set 306, flow continues to block 320. In at least block 312, the model may learn patterns in input data 122 and output data 124 to make predictions and in block 318, the system 300 may apply the model on the remaining data (e.g., testing set 306) to test the predictions.

At block 320, system 300 uses the trained machine learning model (e.g., selected model 308) to analyze expected output data 124 and provide predicted input data for the manufacturing process. In some embodiments, flow may continue to block 312 (e.g., via a feedback loop that is not shown) where the model output is used to execute the manufacturing process and the resulting model output, manufacturing output, or a combination thereof may be used to update the trained model via model training (e.g., model retraining). In some embodiments, responsive to receiving additional training data (e.g., ground truth feedback or corresponding manufacturing process attributes), flow may continue to block 310 to re-train the trained machine learning model based on the additional data and the original data.

In some embodiments, one or more of the acts of blocks 310-320 may occur in various orders and/or with other acts not presented and described herein. In some embodiments, one or more of acts of blocks 310-320 may be absent. For example, in some embodiments, one or more of data partitioning of block 310, model validation of block 314, model selection of block 316, or model testing of block 318 may not be performed.

Figure 4:
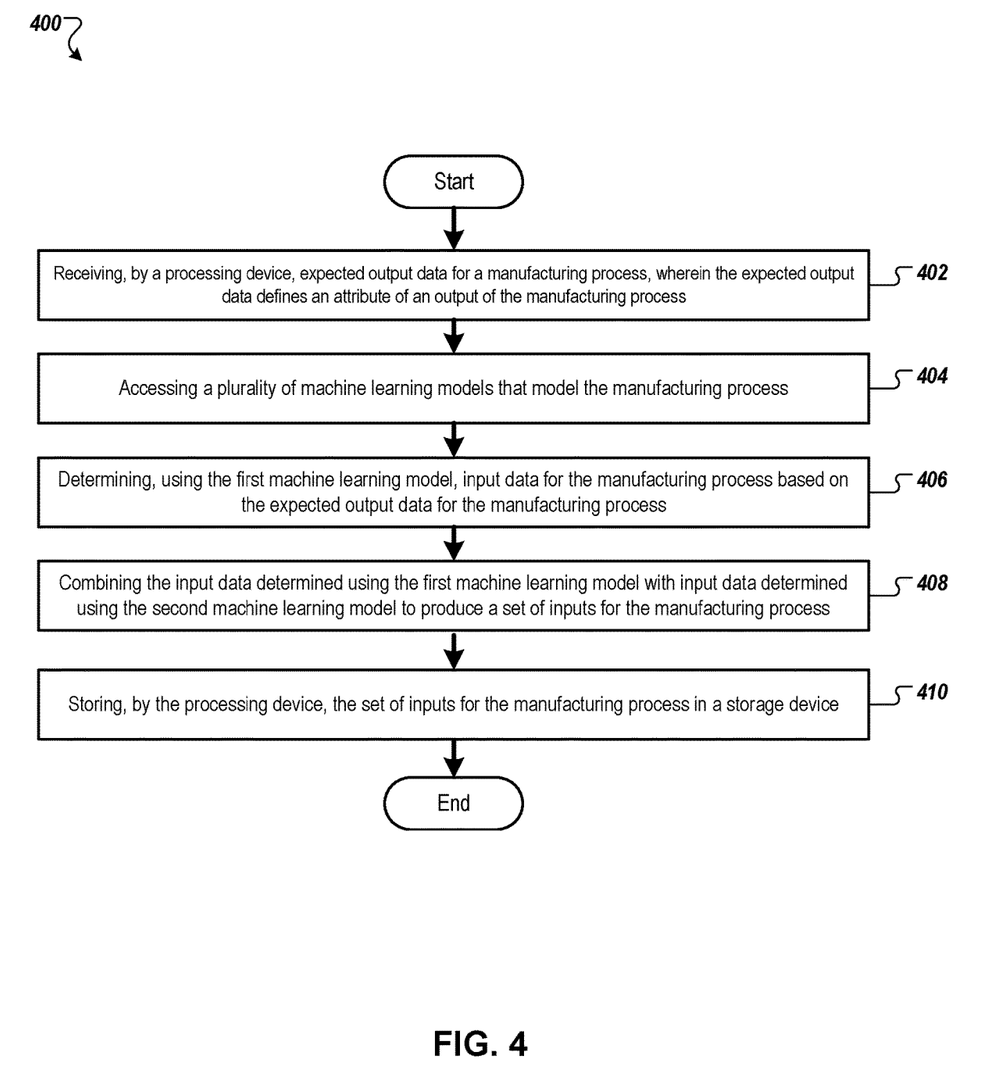
FIG. 4 is a flow diagram illustrating an example method for predicting input values for manufacturing process using a set of machine learning models, according to certain embodiments.

FIG. 4 depicts a flow diagram of one illustrative example of a method 400 for performing predictive modeling to identify inputs for a manufacturing process, in accordance with one or more aspects of the present disclosure. Method 400 and each of its individual functions, routines, subroutines, or operations may be performed by one or more processors of the computer device executing the method. In certain implementations, method 400 may be performed by a single computing device. Alternatively, methods 400 may be performed by two or more computing devices, each computing device executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by inference component 220 as shown in FIG. 2.

Method 400 may be performed by processing devices of a server device or a client device and may begin at block 402. At block 402, a processing device may receive expected output data for a manufacturing process. The expected output data may define an attribute of an output of a future execution of the manufacturing process. In one example, the expected output data for the manufacturing process may include one or more values that indicate a layer thickness, a layer uniformity, or a structural width of a product that will be output by the manufacturing process.

At block 404, the processing device may access a plurality of machine learning models that model the manufacturing process. The plurality of machine learning models may include a plurality of inverted machine learning models that each receive the expected output of the manufacturing process as model input and generate different input data for the manufacturing process as model output. In one example, the plurality of machine learning models may be a homogenous set of machine learning models that share a model architecture and are trained using different hyperparameters, different initialization values, or different training data. The machine learning models may be trained using data from a plurality of prior runs of the manufacturing process. The training process may involve accessing input data and output data of a manufacturing process from the same data source or different data sources. The output data may be annotated with labels that indicate the corresponding input data used by the manufacturing process. The annotated output data may be referred to as training data and each machine learning model may be trained based on the same or different training data.

In one example, the plurality of machine learning models may be Feed Forward Neural Networks (FFNN). The Feed Forward Neural Networks may each model the manufacturing process and may each output a set of inputs to configure the manufacturing process. Each of the Feed Forward Neural Networks may include an input layer, an output layer, and a plurality of hidden layers that collectively function to mathematically model the manufacturing process. The plurality of hidden layers may include a polynomial function and the output layer may be absent any polynomial functions and include one or more linear activation functions which enables more efficient and accurate extrapolation.

At block 406, the processing device may determine, using the first machine learning model, input data for the manufacturing process based on the expected output data for the manufacturing process. The determination may involve executing an inference engine that linearly extrapolates the expected output data of the manufacturing process to identify the input data for the manufacturing process. In one example, the input data for the manufacturing process may include a set of configuration values for the manufacturing process that include a value for at least one of time, temperature, pressure, voltage, or gas flow.

At block 408, the processing device may combine the input data determined using the first machine learning model with input data determined using the second machine learning model to produce a set of inputs for the manufacturing process. The set of inputs may include a plurality of candidate values for a first input of the manufacturing process and a plurality of candidate values for a second input of the manufacturing process. Each machine learning model of the plurality of machine learning models may produce a value for the first input and a value for the second input, and the combining may produce a range of values for the first input and a range of values for the second input. In one example, the combining may involve using an ensemble technique to combine output of the plurality of machine learning models. The combining may also or alternatively involve clustering the different inputs for the manufacturing process into a plurality of groups, wherein a first group comprises model output of a first set of the machine learning models and a second group comprises model output of a second set of the machine learning models.

At block 410, the processing device may store the set of inputs for the manufacturing process in a storage device. The stored data may be transmitted to one or more computing devices that present the stored data to a user using a user interface. The stored data may include a plurality of candidate input sets and each of the candidate input sets may include input values for the manufacturing process that correspond to the expected output data for the manufacturing process. The user interface may be configured to receive a user selection of an input set of the plurality of candidate input sets and may enable the initiation of a run of the manufacturing process using the selected input values. Responsive to completing the operations described herein above with references to block 410, the method may terminate.

Figure 5:
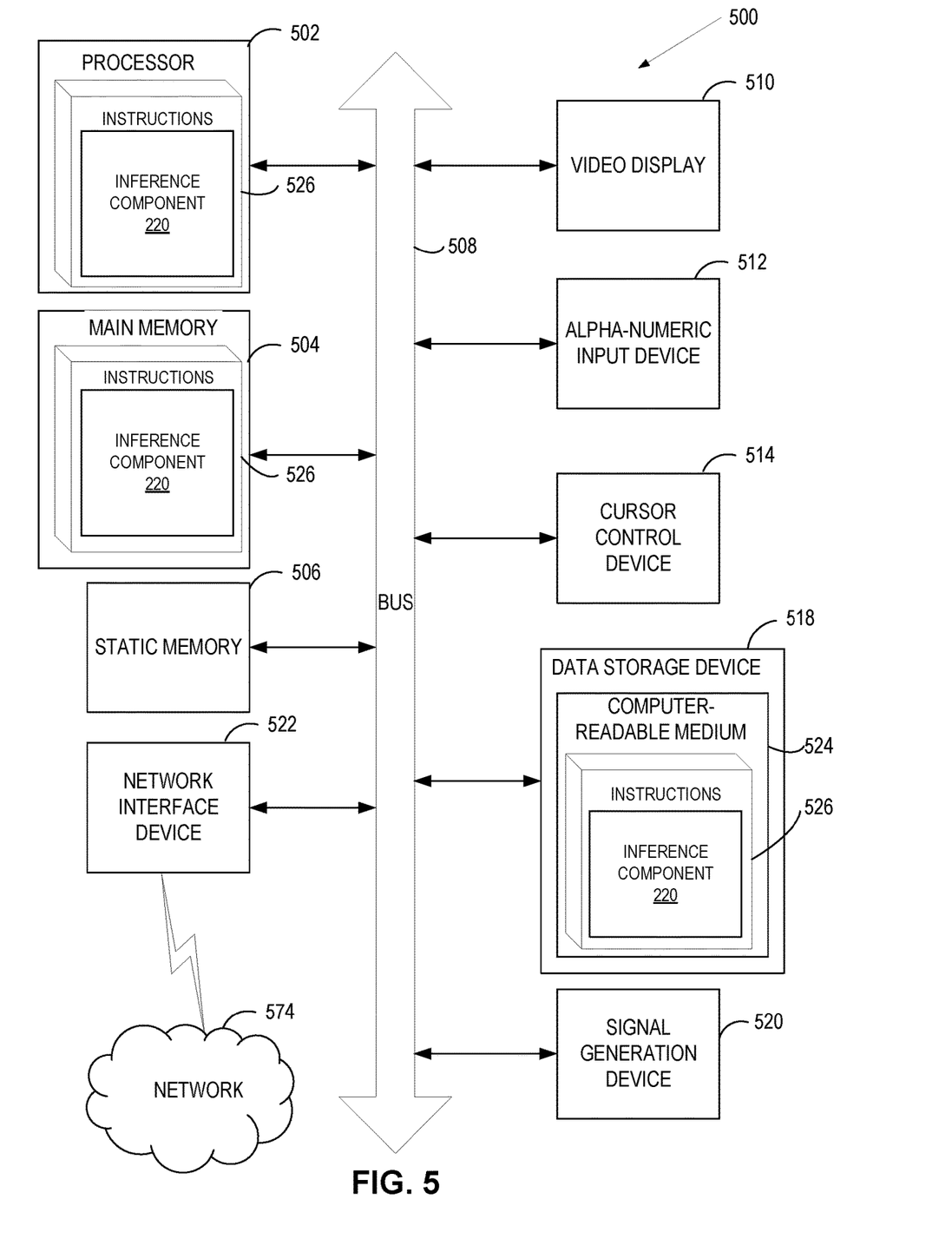
FIG. 5 is a block diagram illustrating a computer system, according to certain embodiments.

FIG. 5 is a block diagram illustrating a computer system 500, according to certain embodiments. In some embodiments, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

In some implementations, data storage device 516 may include a non-transitory computer-readable storage medium 524 on which may store instructions 526 encoding any one or more of the methods or functions described herein, including instructions encoding the training component 210, inference component 220, or presentation component 230 of FIG. 2 and for implementing methods described herein.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "determining," "selecting," "pre-processing," "measuring," "reporting," "updating," "inputting," "training," "creating," "adding," "failing," "causing," "performing," "generating," "using," "comparing," "flipping," "shifting," "rotating," "zooming," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
receiving, by a processing device, expected output data for a semiconductor device manufacturing process performed within at least one processing chamber, the semiconductor device manufacturing process comprising at least one of a deposition process, an etch process or a cleaning process, wherein the expected output data defines an attribute of an output semiconductor device of the semiconductor device manufacturing process, and wherein the expected output data corresponds to an unexplored portion of a process space associated with the semiconductor device manufacturing process;
accessing, by the processing device, a plurality of homogeneous inverted machine learning models that model the semiconductor device manufacturing process, wherein the plurality of homogeneous inverted machine learning models comprises a first inverted machine learning model and a second inverted machine learning model, wherein the first inverted machine learning model and the second inverted machine learning model share a model architecture and are each trained using a different set of data, wherein the first inverted machine learning model and the second inverted machine learning model are each trained to determine, by performing linear extrapolation based on the expected output data, a first set of input data for configuring the semiconductor device manufacturing process and a second set of input data for configuring the semiconductor device manufacturing process, respectively, wherein the first set of input data and the second set of input data each comprise a respective value for a first input and a respective value for a second input, and wherein the first set of input data comprises data related to performing the semiconductor device manufacturing process that is indicative of at least one of: time, energy, temperature, voltage, gas flow rate, wafer spin speed, distance, pressure, a precursor, a reactant, or a dilutant;
determining, by the processing device using the first inverted machine learning model, the first set of input data;
obtaining, by the processing device, the second set of input data;
combining, by the processing device, the first set of input data with the second set of input data to produce a set of semiconductor device manufacturing process inputs defining an extrapolated solution corresponding to the unexplored portion of the process space, wherein the set of semiconductor device manufacturing process inputs comprises a first plurality of candidate values for the first input and a second plurality of candidate values for the second input; and
storing, by the processing device, the set of semiconductor device manufacturing process inputs in a storage device.

2. The method of claim 1, further comprising clustering, by the processing device, the first set of input data and the second set of input data into a plurality of groups, wherein each group of the plurality of groups comprises a respective value for the first input and a respective value for the second input.

3. The method of claim 1, wherein the expected output data for the semiconductor device manufacturing process comprises one or more values that indicate, with respect to the semiconductor device, at least one of: a layer thickness, a layer uniformity, or a structural width.

4. The method of claim 1, wherein the first plurality of candidate input values comprises a range of values for the first input and the second plurality of candidate input values comprises a range of values for the second input.

5. The method of claim 1, wherein each different set of data comprises at least one of: a different hyperparameter, a different initialization value, or different training data.

6. The method of claim 1, wherein the combining comprises using an ensemble technique.

7. The method of claim 1, wherein the plurality of homogeneous inverted machine learning models comprises a plurality of Feed Forward Neural Networks.

8. The method of claim 1, wherein the first inverted machine learning model comprises a Feed Forward Neural Network that comprises an output layer and a plurality of hidden layers to model the semiconductor device manufacturing process, and wherein the plurality of hidden layers comprises a polynomial function and the output layer comprises a linear activation function.

9. The method of claim 1, further comprising:
providing, by the processing device for display, a plurality of candidate input value sets, wherein each candidate input value set of the plurality of candidate input value sets corresponds to the expected output data for the semiconductor device manufacturing process;
receiving, by the processing device, a user selection of a candidate input value set of the plurality of candidate input value sets to obtain a selected candidate input value set; and
initiating by the processing device, a run of the semiconductor device manufacturing process using the selected candidate input value set.

10. A system comprising:
a memory; and
a processing device communicably coupled to the memory, the processing device to:
receive expected output data for a semiconductor device manufacturing process performed within at least one processing chamber, the semiconductor device manufacturing process comprising at least one of a deposition process, an etch process or a cleaning process, wherein the expected output data defines an attribute of an output semiconductor device of the semiconductor device manufacturing process, and wherein the expected output data corresponds to an unexplored portion of a process space associated with the semiconductor device manufacturing process;
access a plurality of homogeneous inverted machine learning models that model the semiconductor device manufacturing process, wherein the plurality of homogeneous inverted machine learning models comprises a first inverted machine learning model and a second inverted machine learning model, wherein the first inverted machine learning model and the second inverted machine learning model share a model architecture and are each trained using a different set of data, wherein the first inverted machine learning model and the second inverted machine learning model are each trained to determine, by performing linear extrapolation based on the expected output data, a first set of input data for configuring the semiconductor device manufacturing process and a second set of input data for configuring the semiconductor device manufacturing process, respectively, wherein the first set of input data and the second set of input data each comprise a respective value for a first input and a respective value for a second input, and wherein the first set of input data comprises data related to Performing the semiconductor device manufacturing process that is indicative of at least one of: time, energy, temperature, voltage, gas flow rate, wafer spin speed, distance, pressure, a precursor, a reactant, or a dilutant;
determine, using the first inverted machine learning model, the first set of input data;
obtain the second set of input data;
combine the first set of input data with the second set of input data to produce a set of semiconductor device manufacturing process inputs defining an extrapolated solution corresponding to the unexplored portion of the process space, wherein the set of semiconductor device manufacturing process inputs comprises a first plurality of candidate values for the first input and a second plurality of candidate values for the second input; and
store the set of semiconductor device manufacturing process inputs in a storage device.

11. The system of claim 10, wherein the plurality of homogeneous inverted machine learning models comprises a plurality of Feed Forward Neural Networks.

12. The system of claim 10, wherein the first plurality of candidate input values comprises a range of values for the first input and the second plurality of candidate input values comprises a range of values for the second input.

13. The system of claim 10, wherein each different set of data comprises at least one of: a different hyperparameter, a different initialization value, or different training data.

14. The system of claim 10, wherein the processing device is further to:
provide for display a plurality of candidate input value sets, wherein each candidate input value set of the plurality of candidate input value sets corresponds to the expected output data for the semiconductor device manufacturing process;
receive a user selection of a candidate input value set of the plurality of candidate input value sets to obtain a selected candidate input value set; and
initiate a run of the semiconductor device manufacturing process using the selected candidate input value set.

15. A non-transitory machine-readable storage medium storing instructions which, when executed, cause a processing device to perform operations comprising:
accessing output training data of a semiconductor device manufacturing process performed within at least one processing chamber, the semiconductor device manufacturing process comprising at least one of a deposition process, an etch process or a cleaning process, wherein the output training data is associated with input training data used by the semiconductor device manufacturing process;
training, based on the output training data and the input training data, a first inverted machine learning model and a second inverted machine learning model, and wherein the first inverted machine learning model and the second inverted machine learning model are homogeneous models that share a model architecture and are each trained using a different hyperparameter;
selecting selected output data and selected input data for the semiconductor device manufacturing process, wherein the selected output data defines an output attribute of the semiconductor device manufacturing process, and wherein the selected output data corresponds to an unexplored portion of a process space associated with the semiconductor device manufacturing process;
determining, using the first inverted machine learning model, a set of input data for configuring the semiconductor device manufacturing process by performing linear extrapolation based on the selected output data, wherein the set of input data comprises a configuration value for a first input and a configuration value for a second input, wherein the set of input data defines an extrapolated solution corresponding to the unexplored portion of the process space, and wherein the first set of input data comprises data related to performing the semiconductor device manufacturing process that is indicative of at least one of: time, energy, temperature, voltage, gas flow rate, wafer spin speed, distance, pressure, a precursor, a reactant, or a dilutant; and comparing the selected input data for the semiconductor device manufacturing process and the set of input data.

16. The non-transitory machine-readable storage medium of claim 15, wherein the first inverted machine learning model and the second inverted machine learning model each comprises a Feed Forward Neural Network.

17. The non-transitory machine-readable storage medium of claim 16, wherein the Feed Forward Neural Network comprises an output layer and a plurality of hidden layers to model the semiconductor device manufacturing process, and wherein the plurality of hidden layers comprises a polynomial function and the output layer comprises a linear activation function.

18. The non-transitory machine-readable storage medium of claim 15, wherein the operations further comprise:

providing for display a plurality of candidate input value sets, wherein each candidate input value set of the plurality of candidate input value sets corresponds to expected output data for the semiconductor device manufacturing process;

receiving a user selection of a candidate input value set of the plurality of candidate input value sets to obtain a selected candidate input value set; and initiating a run of the semiconductor device manufacturing process using the selected candidate input value set.

* * * * *